Nov. 4, 1969  W. J. KUDLATY  3,476,252
RESERVOIR FILTER ASSEMBLY
Filed April 26, 1966  4 Sheets-Sheet 2
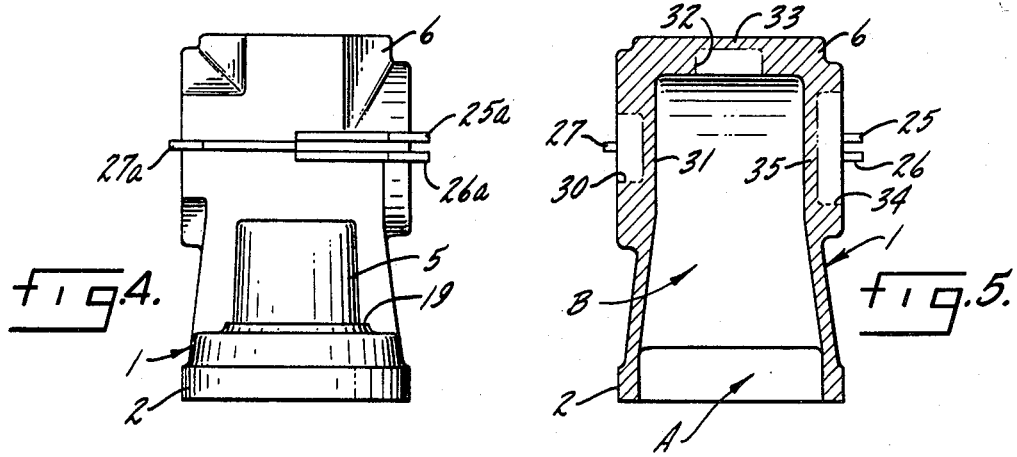
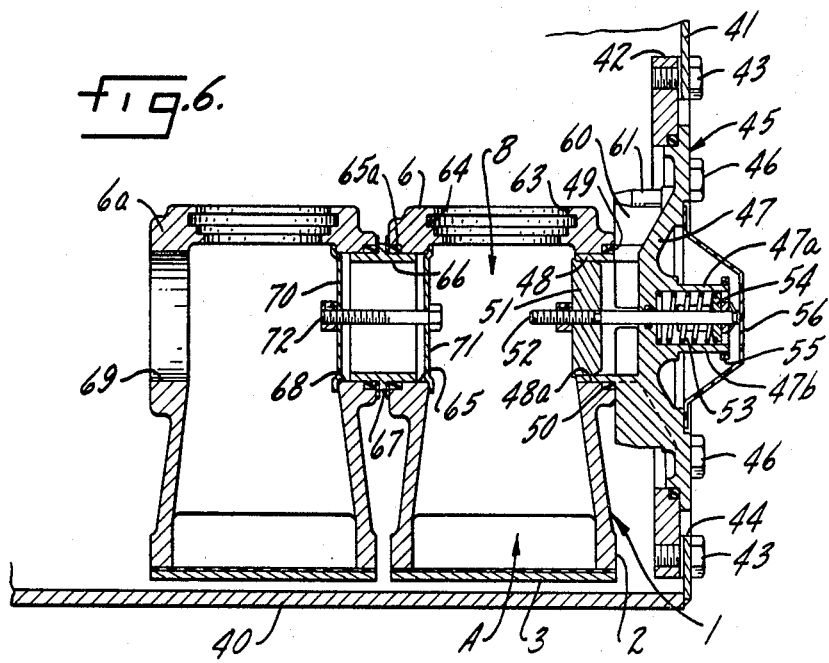
INVENTOR.
Walter J. Kudlaty,
BY Parker & Carter
Attorneys.

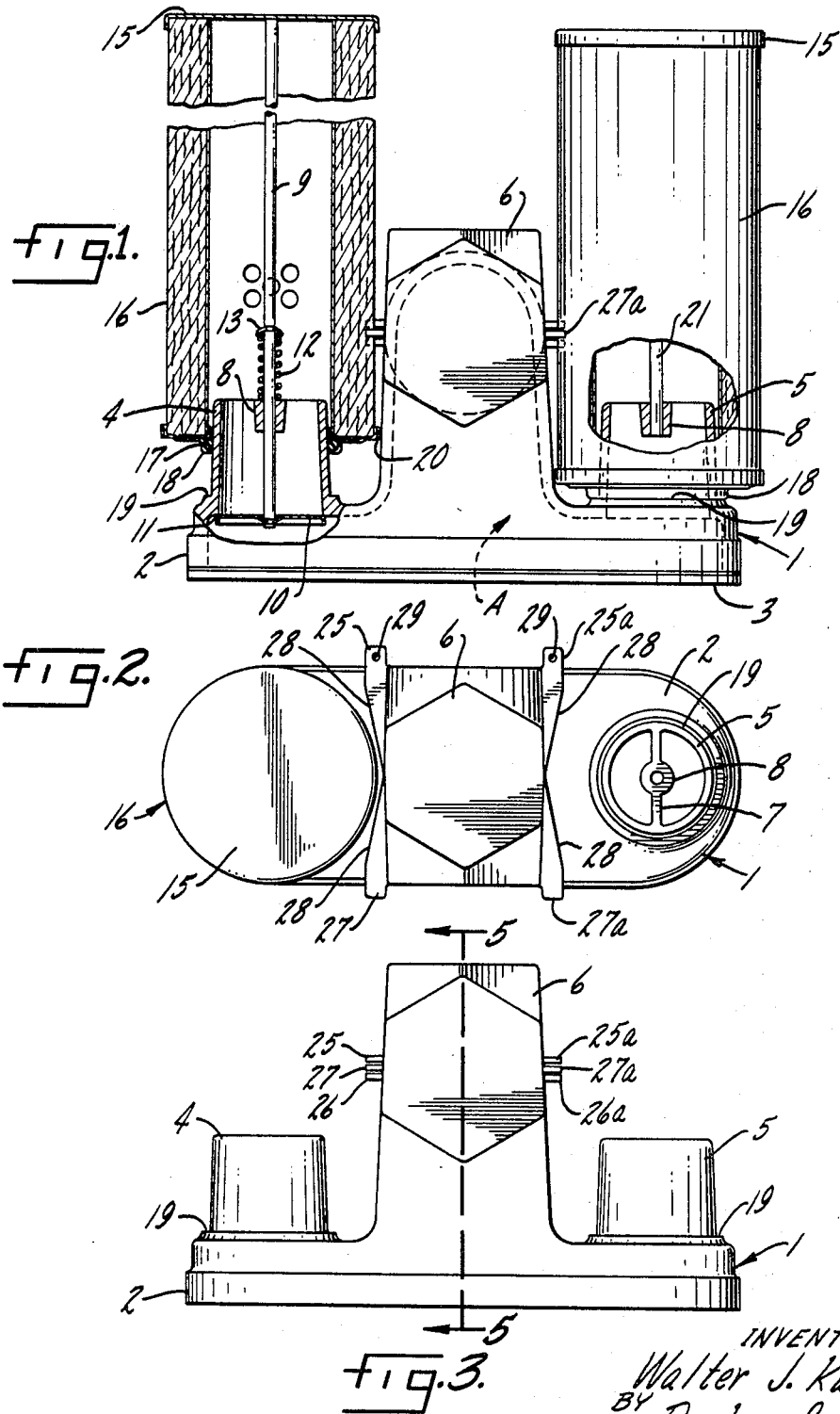

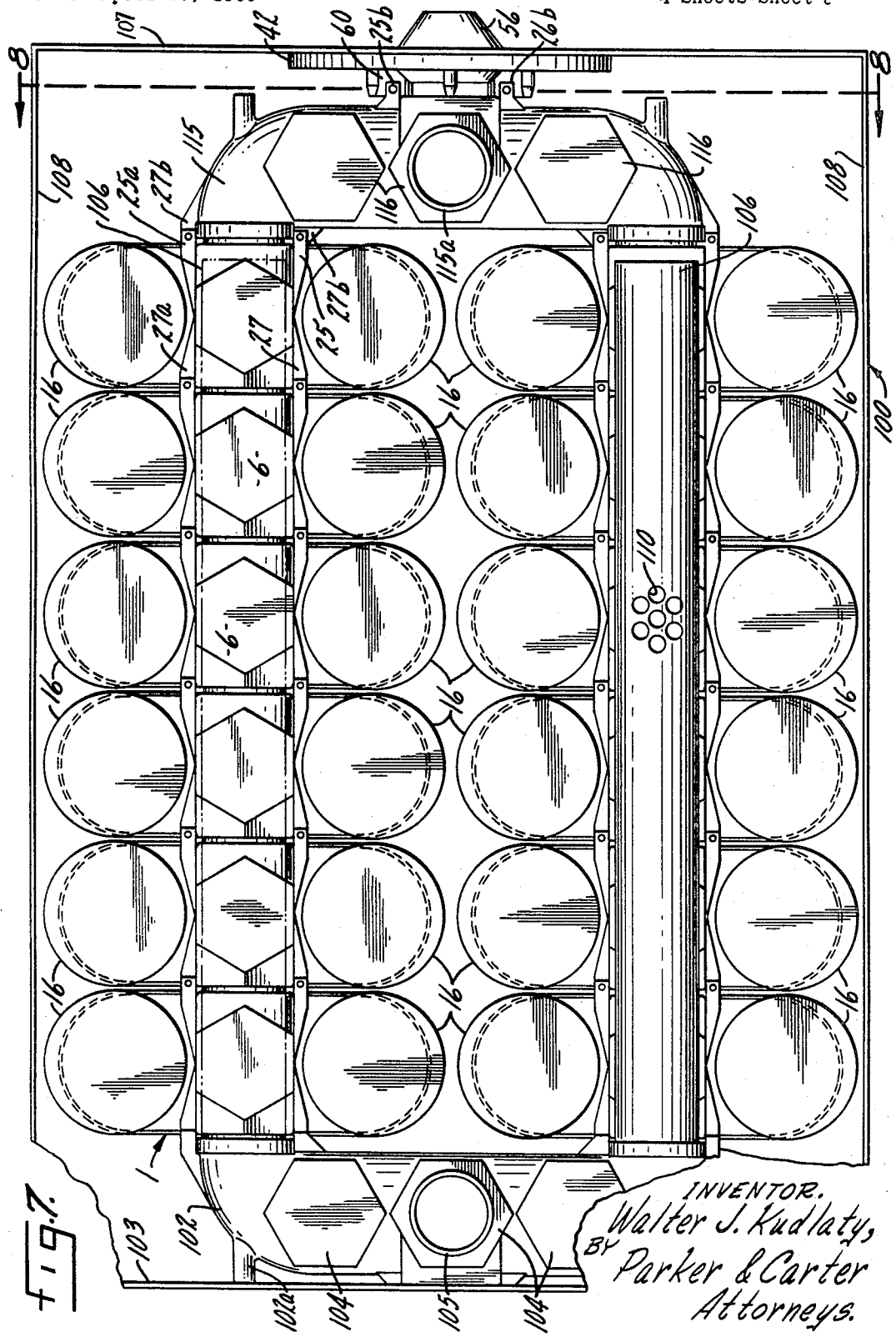

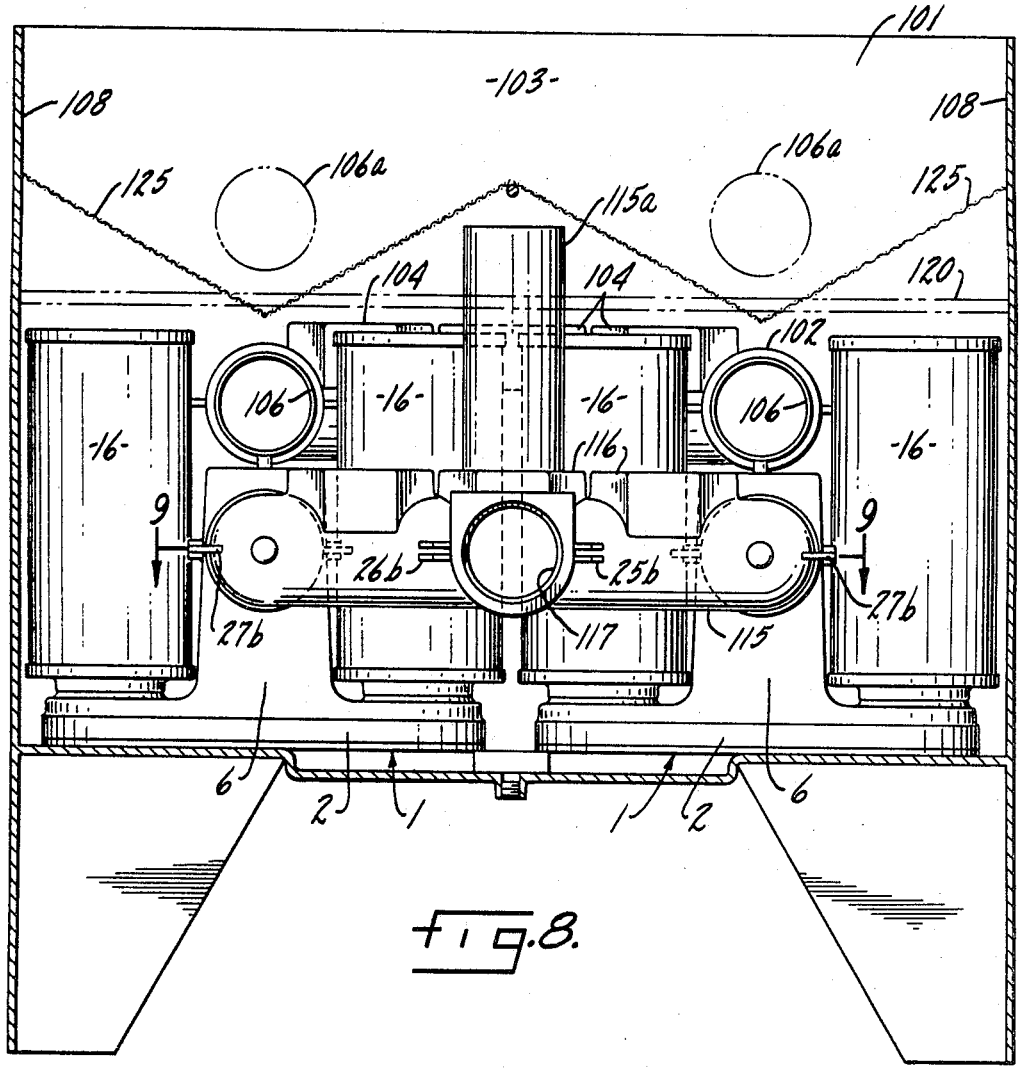
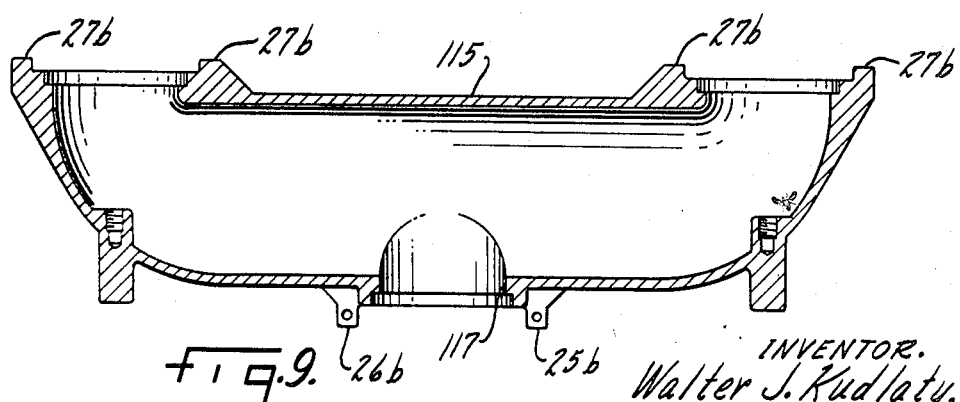

United States Patent Office 3,476,252
Patented Nov. 4, 1969

3,476,252
RESERVOIR FILTER ASSEMBLY
Walter J. Kudlaty, Elmhurst, Ill., assignor to Marvel Engineering Company, Chicago, Ill., a corporation of Illinois
Filed Apr. 26, 1966, Ser. No. 545,399
Int. Cl. B01d 35/00, 33/00
U.S. Cl. 210—323        1 Claim

ABSTRACT OF THE DISCLOSURE

A filtering assembly wherein a plurality of communicating filter element support members carry external filter elements in a tank, an inlet feeds the tanks externally of the elements and an outlet extends from the members to a point externally of the tank for flow of fluid from said inlet through said elements, members and outlet.

---

This invention relates to filtering and has particular relation to a filter assembly for reservoirs, tanks and the like.

One purpose is to provide a filter assembly capable of maximum filtration.

Another purpose is to provide a filter assembly capable of filtering a substantial volume of fluid.

Another purpose is to provide a filter assembly having means permitting replacement of filter elements therein without interruption of machinery employing filtered fluid.

Another purpose is to provide a filter assembly capable of employing a varying number of filter elements.

Another purpose is to provide a filter assembly capable of employing a varying number of filter elements and requiring a minimum number of different castings.

Another purpose is to provide a filter assembly including means for positioning and securing a plurality of said assemblies.

Another purpose is to provide a dual-filter receiving body member.

Another purpose is to provide a dual-filter receiving body member including means for assembling a plurality of said members into a unitary filtering assembly.

Another purpose is to provide a multi-filter assembly having means for indicating the effectiveness thereof.

Another purpose is to provide a multi-filter assembly having means automatically precluding the passage of unfiltered fluid when filter elements are replaced therein.

Other purposes will appear from time to time during the course of the specification and claim.

FIGURE 1 is a side elevation with parts broken away and parts in cross-section;

FIGURE 2 is a top view of the structure illustrated in FIGURE 1, with parts removed for clarity;

FIGURE 3 is a side view of the body member element of the invention;

FIGURE 4 is an end view of the structure of FIGURE 3;

FIGURE 5 is a cross section taken on the line 5—5 of FIGURE 3;

FIGURE 6 is a side view, in cross section, illustrating elements of the invention installed in a reservoir;

FIGURE 7 is a top plan view illustrating a multi-filter assembly;

FIGURE 8 is an end view of the structure of FIGURE 7; and

FIGURE 9 is a cross-sectional view taken on the line 9—9 of FIGURE 8 of an end manifold shown in FIGURE 8.

Like parts are indicated by like numerals throughout the specification and drawings.

Referring now to the drawings, and particularly to FIGURES 1–5, the numeral 1 generally indicates a filter body member. The body member 1 includes an elongated hollow base 2 defining, with a closure or cover 3, an elongated chamber A. Upstanding at opposite ends of base 2 are hollow sleeves 4, 5. Upstanding on and centrally of the base 2, between sleeves 4, 5, is a filtered-fluid receiving head 6 which in turn defines chamber B as shown in FIGURE 5, the chamber B, like the sleeves 4, 5, communicating with chamber A.

A bridge, shown best at 7 in FIGURE 2, extends across the upper open ends of each sleeve 4, 5 and carries a central enlargement or sleeve 8 in which rod 9 is slidably mounted. Rod 9 carries, at one of its ends, a check valve plate 10 for seating against seat 11 to preclude communication between sleeve 4 and chamber A. A relatively light spring 12 engages enlargement 8 and a shoulder 13 secured to rod 9 to urge plate 10, through the mediacy of rod 9, onto its seat 11. The external opposite end of rod 9 rises well above sleeve 4 and is positioned for contact by an end plate 15 of a filter element 16 as said filter element is moved into engagement with sleeve 4. The filter element 16 illustrated in FIGURE 1 is shown as having been moved partially toward its operative position on sleeve 4. Plate 15 has engaged rod 9. It will be understood that the friction seal ring 17 carried by filter member 16 sealingly engages the external surface of sleeve 4 and that the retainer 18 for seal 17 seats upon an annular flange 19 surrounding sleeve 4 on base 2 when the filter element is in desired operative position. A second frictional sealing member 20 may be carried externally of filter member 16 for engagement with the external surface of head 6 to frictionally insure retention of filter member 16 in operative position, the opposed surfaces of sleeve 4 and head 6 lying in downwardly (as the parts are shown) converging planes.

In those installations in which check valve plate 10 is not desired, a positioning rod 21, such as that shown in the right-hand portion of FIGURE 1, may be press-fitted into enlargement 8 and serve as a positioning element for the filter member 16.

As may be best seen in FIGURES 2–4, bayonet-engaging elements are formed on the head 6. Said elements include spaced parallel bars 25, 26 extending beyond the head 6 on one side thereof and intermediate the upper and lower ends of the head 6. A second set of identical parallel bars 25a, 26a extends in the same direction beyond the head 6 on the opposite side thereof and in the same respective planes as the bars 25, 26 and in parallel therewith. Extending beyond the head 6 in the opposite direction from the bars 25, 26 is a single positioning bar 27 on one side of the head 6 and a bar 27a on the other side of the head 6. It will be observed that the bars 27, 27a parallel each other and extend respectively between the planes occupied by the bars 25, 26 and 25a, 26a. The bars 25–27a, inclusive, have their external side edges tapered toward the center of head 6, as indicated, for example, at 28 in FIGURE 2, to provide for ease of installation and removal of filter elements 16 on sleeves 4, 5. As illustrated in FIGURES 2 and 4, the bars 25–26a, inclusive, have their extending portions apertured as indicated at 29 for purposes hereinbelow described.

Illustrated in FIGURE 5, in cross section, is the body member 1, the said illustration being an end view thereof in cast form. It will be observed that provisions are made for selectively drilling openings or outlets in the upper portion of the cast head portion 6, the external surface of the head 6 having, for example, the recess or well 30 providing a thinner wall section 31 which may be drilled to provide a lateral opening in the head 6. An internal recess or well 32 is formed in the upper inner end surface of the head 6, providing a thinner wall section 33 which may be removed to provide an upwardly directed outlet for the head 6. A third recess or well 34 is formed in the external wall of the head 6 in axial alignment with the recess 30 to provide a thin wall section 35 which may be removed for purposes described hereinbelow.

Referring now to FIGURE 6, there is illustrated an installation of the structure above described within a reservoir (the reservoir being partially shown), the numeral 40 designating the bottom wall of such a reservoir or tank, a side wall being partially indicated at 41. An adapter plate 42 is secured, as by fasteners 43, within an aperture 44 in the reservoir side wall 41.

An indicator-bypass valve structure 45 is secured to the adapter plate 42 as by the fasteners 46. The indicator-bypass valve structure includes the closure plate 47 carrying a central hollow sleeve 48 dimensioned for seating within the opening 48a and communicating with the chamber B in head 6 when the segment 35 has been removed. In such event, the internal surface of recess 34 is offset as at 49 to receive seal 50 for sealing engagement with the external surface of sleeve 48. A bypass valve member 51 seats against and closes sleeve 48 against communication with chamber B, the valve 51 being secured to rod 52 which in turn extends through closure 47 and into the external extension 47a thereon. A spring 53 is carried within extension 47a and engages a plate 54 carried by rod 52 to urge rod 52 outwardly of plate 47 and thus to urge valve 51 into seating engagement with sleeve 48. An indicator member 55 is carried by the distal end of rod 52 for movement along the external surface 47b of extension 47a to indicate the position of valve 51 and thus to indicate the condition of the filter elements 16. A transparent cover 56 overlies extension 47a and the elements associated therewith.

The closure or cover plate 47 has, on opposite sides of sleeve 48, a set, four in number, of relatively thin, radially disposed leg elements indicated at 60. The leg elements 60 carry at their outer edges enlargements 61. As may be best realized from FIGURE 2, a pair of leg elements 60 interpenetrate with the bars 25, 26 and 25a, 26a and are suitably apertured for reception of pins or similar locking elements inserted through openings 29 in the external portions of bars 25, 26 and 25a, 26a.

It will be seen in FIGURE 6 that wall portion 33 of the structure shown in FIGURE 5 has been removed and recess 32 enlarged to provide an opening 63 in the upper portion of head 6 and the groove 64 therein. It will be understood that a suitable seal (not shown) is carried within groove 64 and that suitable piping, tubing or the like (not shown) is insertable in opening 63 for sealing engagement with the seal in groove 64, said piping or tubing leading to the fluid pump for subsequent delivery of filtered fluid under pressure to the machine requiring the same.

It will be realized that the wall 33 may have been left in place and the wall 31 removed, the recess 30 being suitably enlarged, for insertion of similar piping or tubing in the lateral opening thus provided in head 6 and for delivery of fluid through such piping or tubing to a suitable pump. Similarly, fluid may thus be delivered both vertically and laterally from the head 6 as desired.

As illustrated in FIGURE 6, however, the lateral opening 65 in head 6 has been formed of identical size and in axial alignment with the opening 48a which receives the sleeve 48. A hollow adapter sleeve 66 is positioned in the opening 65, the inner surface of opening 65 being recessed to receive a seal 65a for sealing engagement with the external surface of sleeve 66 within opening 65. A circumferential external flange 67 is carried by sleeve 66 for extension between the head 6 and a second head 6a positioned adjacent thereto.

The head 6a has a pair of axially aligned openings 68, 69 identical in size and axially aligned with the openings 48a, 65 in the head 6. The sleeve 66 extends into opening 68. A pair of elongated, relatively thin straps 70, 71 engage the inner surfaces of the heads 6, 6a about the periphery of the openings 65, 68 and a suitable fastener such as the bolt 72 clamps the straps 70, 71 in position and thus clamps the heads 6, 6a together, clamping the flange 67 therebetween. Thus fluid may pass through opening 68, sleeve 66 and opening 65, from head 6a to head 6. It will be realized, of course, that any desired number of structures identical to head 6a may similarly be added in series and that fluid entering each such head will have been previously filtered through one of the filter elements carried by the body member with which each head is associated.

Referring now to FIGURES 7–9, there is illustrated a reservoir-filter assembly wherein a reservoir or tank 100 is shown as having an open upper portion as indicated at 101 for atmospheric venting. A first end manifold 102 abuts an end wall 103 of the resrvoir, feet 102a being provided for this purpose. The manifold 102 has a plurality (shown as three) of upwardly extending portions or enlargements 104. It will be understood that one or more of the enlargements 104 are open to receive an inlet tube, such as that shown at 105 in FIGURE 7. Any suitable tubing may be suitably engaged with one or more of the inlet elements 104, any elements 104 not utilized being capped off.

Secured to and communicating with the end manifold 102 is a pair of spaced, parallel idspersal tubes 106. The dispersal tubes 106 extend from end manifold 102 toward the opposite wall 107 of reservoir or tank 100 and are spaced inwardly from the longitudinal walls 108 of the tank or reservoir 100. The dispersal tubes are suitably apertured as partially indicated at 110 for dispersal of fluid delivered through one or more of the inlets 104 and manifold 102 to the tubes 106.

Extending beneath each of the tubes 106 is a plurality of body members 1, each of which carries a pair of filter elements 16, each tube 106 extending over the line of communicating heads 6 and between the filter elements carried by each said head. It will be observed that the bars 27, 27a of most of the heads 6 extend between and interlock with the spaced bars 25, 26 and 25a, 26a of the adjacent head 6 on the body members 1.

An end manifold 115 has its opposite end portions communicating with the last head members 6 of the two rows of the assembly for reception of filtered fluid therefrom, it being understood that all of the heads 6 in each row are in communication through openings corresponding to openings 68, 65 and hollow sleeves 66 as illustrated in FIGURE 6, for example. The filtered fluid received in manifold 115 is then directed outwardly therefrom through one of the outlet elements or enlargements 116 in manifold 115, any of the outlets 116 not in use being capped off.

The manifold 115 has a dual set of bars 25b, 26b, corresponding to the bars 25–26a, previously described, for engagement with the legs 60 of the plate 47 as illustrated in the right-hand portion of FIGURE 7 and the manifold 115 has an outlet 117 positioned to receive sleeve 48 in the manner illustrated, for example, in FIGURE 6. Manifold 115 also has rearwardly extending bars 27b for interpenetration with bars 25 of the adjacent head 6.

As shown in phantom lines at 120 in FIGURE 8, an upper wall may be provided for the tank 100 at a point substantially adjacent the upper edges of the filters 16 to enclose the entire filter assembly, the inlet tube 105 and outlet tube 115a, in that case, extending through the upper wall 120, it being understood that the wall 120 may be supplied for low pressurized filtration. Similarly, the tubes 106 may be optionally positioned at a higher point, as shown in phantom lines at 106a in FIGURE 8, when the wall 120 is absent. In such optional position a relatively coarse screen, such as that shown in phantom lines at 125 in FIGURE 8, may be positioned between each dispersal tube for initial entrapment of the more coarse deleterious material and consequent increase in the service life of the filters 16.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

There is claimed:

1. A filtering assembly including a tank, a plurality of filter element support members in said tank, the areas within said members communicating one with the other, filter elements carried on each of said members and positioned to filter fluid flowing from said tank into each of said members, an outlet conduit communicating with at least one of said members, an inlet conduit positioned to deliver fluid to said tank externally of said filter elements, each of said filter element support members including a body portion defining a first chamber and a raised central head defining a second chamber in communication with said first chamber, a pair of sleeves on said body portion communicating with said first chamber, one of said sleeves being positioned on each side of said head, each of said filter elements being positioned to sealingly engage one of said sleeves to filter fluid entering each said sleeve from said tank, means connecting and placing each of said heads in fluid communication with at least one of the remainder of said heads, means connecting and placing one of said heads in fluid communication with said outlet conduit, and said inlet conduit including at least one perforated dispersal tube extending above said heads and between the planes occupied by said filter elements.

References Cited

UNITED STATES PATENTS

| | | | |
|---|---|---|---|
| 1,778,596 | 10/1930 | Heibig | 210—333 X |
| 2,061,343 | 11/1936 | Bichler et al. | 210—340 |
| 2,440,487 | 4/1948 | Rayburn | 210—323 X |
| 2,767,851 | 10/1956 | Muller | 210—333 X |
| 3,074,561 | 1/1963 | Mummert | 210—340 X |
| 3,193,100 | 7/1965 | Broughton | 210—340 X |
| 3,317,048 | 5/1967 | Kasten | 210—323 X |
| 3,388,801 | 6/1968 | Boyd et al. | 210—234 |
| 3,394,815 | 7/1968 | Harns et al. | 210—323 |

REUBEN FRIEDMAN, Primary Examiner

W. S. BRADBURY, Assistant Examiner

U.S. Cl. X.R.

210—90, 130, 234